US012682656B2

(12) United States Patent
Paga et al.

(10) Patent No.: US 12,682,656 B2
(45) Date of Patent: Jul. 14, 2026

(54) MULTI-MODAL CONTEXTUALIZATION FOR OBJECT DETECTION

(71) Applicant: Raven Industries, Inc., Sioux Falls, SD (US)

(72) Inventors: Venkata Rama Karthik Paga, Tempe, AZ (US); Matthew K. Rust, Chandler, AZ (US); Aziz Alibasic, Waukee, IA (US); Huiyan Wu, Downingtown, PA (US)

(73) Assignee: Raven Industries, Inc., Sioux Falls, SD (US)

( * ) Notice: Subject to any disclaimer, the term of this patent is extended or adjusted under 35 U.S.C. 154(b) by 161 days.

(21) Appl. No.: 18/619,108

(22) Filed: Mar. 27, 2024

(65) Prior Publication Data

US 2024/0338952 A1 Oct. 10, 2024

Related U.S. Application Data

(60) Provisional application No. 63/495,147, filed on Apr. 10, 2023.

(51) Int. Cl.
| | |
|---|---|
| *G06V 20/58* | (2022.01) |
| *G05D 1/242* | (2024.01) |
| *G05D 1/243* | (2024.01) |
| *G05D 105/15* | (2024.01) |
| *G05D 107/20* | (2024.01) |

(Continued)

(52) U.S. Cl.
CPC ............. *G06V 20/58* (2022.01); *G05D 1/242* (2024.01); *G05D 1/2435* (2024.01); *G05D 2105/15* (2024.01); *G05D 2107/21* (2024.01); *G05D 2111/10* (2024.01); *G05D 2111/30* (2024.01)

(58) Field of Classification Search
CPC ...... G06V 20/58; G05D 1/242; G05D 1/2435; G05D 2105/15; G05D 2107/21; G05D 2111/10; G05D 2111/30; G01S 13/865; G01S 13/867; G01S 13/931; G01S 17/931; G01S 7/417
See application file for complete search history.

(56) References Cited

U.S. PATENT DOCUMENTS

| | | | |
|---|---|---|---|
| 10,582,185 B2 | 3/2020 | Jensen et al. | |
| 2018/0120842 A1* | 5/2018 | Smith ..................... | G01S 7/412 |

(Continued)

OTHER PUBLICATIONS

"International Application Serial No. PCT US2024 021802, International Search Report mailed Jul. 8, 2024", 5 pgs.

(Continued)

*Primary Examiner* — Ig T An
(74) *Attorney, Agent, or Firm* — Schwegman Lundberg & Woessner, P.A.

(57) ABSTRACT

Techniques for multi-modal contextualization of object detection for use with an agricultural vehicle are described herein. The techniques can provide additional context information to radar detection to assess the likelihood of an object detected by radar of being an object of interest. Examples of detection that might be detected by a radar sensor that, based on the additional context information, the agricultural vehicle can make a determination to ignore can include ground targets, ghost targets, side or overhead reflections from obstacles, detections from tall crops/weeds in a field.

18 Claims, 12 Drawing Sheets

(51) Int. Cl.
  *G05D 111/10* (2024.01)
  *G05D 111/30* (2024.01)

(56) References Cited

U.S. PATENT DOCUMENTS

| | | | | |
|---|---|---|---|---|
| 2020/0219264 A1* | 7/2020 | Brunner | ................. | G01S 17/89 |
| 2021/0157321 A1* | 5/2021 | Wang | ........................ | G06T 7/62 |
| 2022/0117215 A1* | 4/2022 | Sibley | ................... | A01M 21/00 |
| 2022/0319328 A1* | 10/2022 | Zhang | ................... | G06V 20/56 |
| 2023/0038842 A1 | 2/2023 | Yu et al. | | |
| 2023/0049567 A1 | 2/2023 | Popov et al. | | |
| 2024/0385315 A1* | 11/2024 | Lunn | .................... | G01S 17/931 |

OTHER PUBLICATIONS

"International Application Serial No. PCT US2024 021802, Written Opinion mailed Jul. 8, 2024", 6 pgs.

* cited by examiner

1200

MULTI-MODAL CONTEXTUALIZATION FOR OBJECT DETECTION

CLAIMS OF PRIORITY

This patent application claims the benefit of priority to U.S. Provisional Patent Application Ser. No. 63/495,147, titled "MULTI-MODAL CONTEXTUALIZATION OF OFF HIGHWAY SENSING FOR OBJECT DETECTION," filed Apr. 10, 2023, which is hereby incorporated herein in its entirety.

TECHNICAL FIELD

The present disclosure generally relates to detection and classification of objects using multiple sensors for autonomous operation of agricultural vehicles and machinery.

BACKGROUND

Vehicles, such as agricultural vehicles, are adopting autonomous or driverless functionality. In some vehicles, a radar can be used to detect objects in the path of the vehicle. However, conventional detection techniques cannot discern characteristics of the object to determine whether the object is really an object of interest or not (i.e., non-drivable object vs. drivable object). For example, conventional techniques may stop the vehicle even if small objects, such as a single corn stalk, are detected in the path. As another example, elevation of the ground, such as driving up from a ditch, can also lead to performance issues because the radar can detect the higher ground in the path and cause the vehicle to unnecessarily stop.

SUMMARY

This document describes a system for autonomously-operating an agricultural vehicle. The system includes one or more a radar detectors coupled to the agricultural vehicle to generate radar data including a first set of one or more objects in a navigation path of the agricultural vehicle, a camera coupled to the agricultural vehicle to generate image data, and a 3D sensor coupled to the agricultural vehicle to generate 3D sensor data. The system also includes a processor communicatively coupled to the radar detector, camera, and 3D sensor, the processor configured to: generating a view including a second set of one or more objects in the navigation path of the autonomously-operated vehicle based on the image data, 3D sensor data, and a model; comparing the first set of one or more objects and the second set of one or more objects to generated augmented radar detection data; and outputting the augmented radar detection data to control navigation of the agricultural vehicle.

This document also describes a method for operating an agricultural vehicle, the method comprising: receiving radar data including a first set of one or more objects in a navigation path of the agricultural vehicle; receiving image data; receiving 3D sensor data; generating a view including a second set of one or more objects in the navigation path of the agricultural vehicle based on the image data, 3D sensor data, and a model; comparing the first set of one or more objects and the second set of one or more objects to generated augmented radar detection data; and outputting the augmented radar detection data to control navigation of the agricultural vehicle.

This document further describes a machine-readable medium embodying instructions that, when executed by a machine, cause the machine to perform operations comprising: receiving radar data including a first set of one or more objects in a navigation path of an agricultural vehicle; receiving image data; receiving 3D sensor data; generating a view including a second set of one or more objects in the navigation path of the agricultural vehicle based on the image data, 3D sensor data, and a model; comparing the first set of one or more objects and the second set of one or more objects to generated augmented radar detection data; and outputting the augmented radar detection data to control navigation of the agricultural vehicle.

BRIEF DESCRIPTION OF THE DRAWINGS

Various ones of the appended drawings merely illustrate example implementations of the present disclosure and should not be considered as limiting its scope.

DETAILED DESCRIPTION

Figure 1:
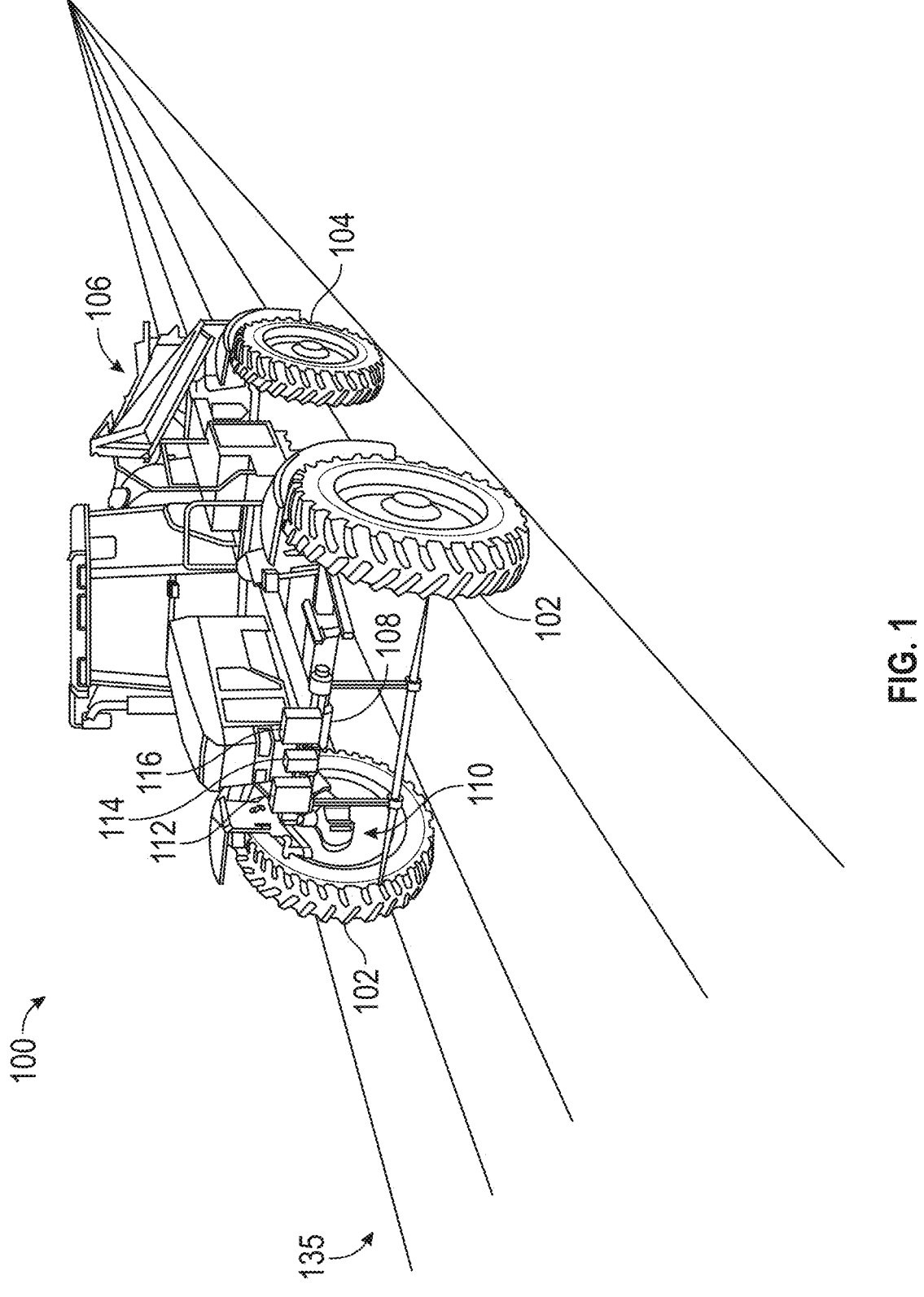
FIG. 1 illustrates example portions of an agricultural vehicle with an object detection system.

FIG. 1 illustrates example portions of an agricultural vehicle 100 with an object detection system. The agricultural vehicle 100 can include any vehicle or equipment that is configured to process a field, such as by planting, harvesting, or generally tending to a crop. Examples of such agricultural vehicles include tractors, planters, harvesters, irrigators, or fertilizers. As shown in FIG. 1, the agricultural vehicle 100 includes one or more ground engaging elements, such as front wheels 102 and rear wheels 104, and one or more agricultural implements, such as a sprayer boom 106. The ground engaging elements and the agricultural implements can each be coupled to the vehicle chassis 108 and may each be configured to actuate or articulate independently such chassis. In some examples, the front wheels 102 are coupled to the chassis 108 though a wheel assembly 110 and may be configured to articulate at one or more angles relative to the chassis. Similarly, the agricultural implement can be coupled to the chassis 108 though an implement rack (not shown) and may be configured to independently extend, retract, fold, or rotate.

The agricultural vehicle 100 can include a control module, such as a vehicle electronic controller unit (ECU) or other computing device (not shown), to guide the agricultural vehicle 100 through the field 135. In some examples, a GPS sensor can provide data that is indicative of the global position of the agricultural vehicle 100 in the field 135.

A radar sensor 112, a camera 114, and a 3D sensor 116 may be coupled to the agricultural vehicle 100 to provide object detection and collision avoidance to guide the autonomous operation of the agricultural vehicle 100. The radar sensor 112 may be provided as one or more radar detectors and include a transmitter to emit radio waves or microwaves, and a receiver to analyze waves that are reflected back from objects in the field of view of the radar sensor 112. The radar sensor 112 can measure the time for reflected wave to be received, and determine the presence, distance, and/or speed of detected objects in the field of view.

The camera 114 may be provided as one or more monocular cameras. The camera 114 may generate an instantaneous RGB (Red, Green, Blue) image of the field of view of the camera 114.

The 3D sensor 116 may determine depth up to a certain value with an associated confidence interval. For example, a virtual computational sensor such as "Depth Prediction" Deep Learning Model may be used. In some examples, the 3D sensor 116 may be provided as a stereo camera system. For example, the stereo camera system may include two or more image sensors with each image sensor including one more lenses. The image sensors may generate a stereoscopic image corresponding to high spatial resolution depth measurements of the field of view. In some examples, the 3D sensor may be provided as a Lidar sensor.

The navigation control of the agricultural vehicle 100 may adjust navigation of the agricultural vehicle 100 based on detected objects. For example, objects in the field 135 can be detected by the radar sensor 112. However, some objects (e.g., single stalk of corn) can be considered drivable objects, where the navigation control can operate the agricultural vehicle 100 to drive over the objects while some objects (e.g., humans) can considered non-drivable objects. Determining whether an object is a drivable or non-drivable object can be difficult using radar data.

Techniques for multi-modal contextualization of object detection are next. The techniques can provide additional context information to radar detection to assess the likelihood of an object detected by radar of being an object of interest. Examples of detection that might be detected by a radar sensor that, based on the additional context information, the vehicle can make a determination to ignore can include ground targets, ghost targets, side or overhead reflections from obstacles, detections from tall crops/weeds in a field.

The techniques can include enhancing the context of a radar target through use of a drivable area AI (Artificial Intelligence)/ML (Machine Learning) model that is projected into a 3D plane. The 3D projected non-drivable targets are then evaluated for proximal overlap with a radar target. This additional context can be used to enhance the likelihood calculation for identifying radar targets of interest and as a result reducing the number of false positive events while not increasing the number of false negative events and compromising safety.

Figure 2:
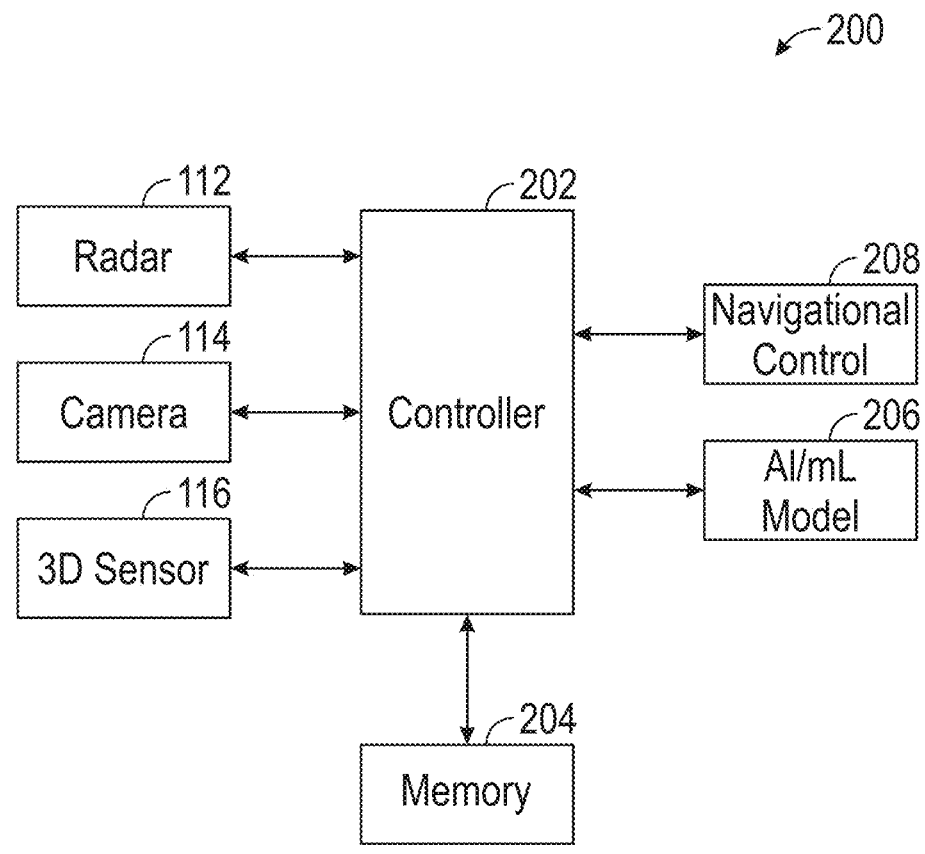
FIG. 2 illustrates a simplified block diagram of example portions of a detection system.

FIG. 2 illustrates a simplified block diagram of example portions of a detection system 200. The detection system 200 may be associated with a vehicle, such as an agricultural vehicle, as described above. For example, portions of the detection system 200 may be provided with the vehicle. The detection system 200 may include a radar sensor 112, a camera 114, a 3D sensor 116, a controller 202, a memory 204, an AI/ML model 206, and a navigation control 208.

The radar sensor 112 may generate radar data the field of view of the radar sensor 112. The output of the radar sensor 112 can be an instantaneous list of an angular orientation, a distance, and a velocity of detected objects relative to a center of a field of view from reflected signals in the radar data. The camera 114 may generate an image of the field of view of the camera 114. The output of the camera 114 may be an instantaneous RGB image. The 3D sensor 116 may generate depth resolution data of the field of view of the 3D sensor 116. The respective field of views of radar sensor 112, camera 114, and 3d sensor 116 may overlap.

A controller 202 may include a one or more microprocessors (e.g., digital signal processor (DSP)). In some examples, the controller 202 may be coupled to the radar sensor 112, camera 114, and 3d sensor 116 and be provided in the vehicle. In some other examples, the controller 202 may be provided in a remote location (e.g., cloud platform) and is communicatively coupled to the radar sensor 112, camera 114, and 3d sensor 116.

The memory 204 may store sensor data, such as radar data, image data, and 3D sensor data. The memory 204 may be provided in the vehicle or at a remote location (e.g., cloud storage).

The AI/ML model 206 may include a deep learning model to identify drivable and non-drivable objects in received image data be. In some examples, the AI/ML model 206 may be provided as a multi-layered machine learning model. Prior to runtime operations, the AI/ML model 206 may be trained with supervised learning using a set of training images with labeled drivable and non-drivable objects. The set of training images may be inputted into the AI/ML model 206. Also, for each segment of the image, a label related to whether an object present in the segment as drivable or non-drivable may be received. The labels may be generated by a manual process. For example, segments with known non-drivable objects may be labeled with a non-drivable object label (e.g., "1") and segments without a known drivable object may be labeled with a drivable label (e.g., "0"). A reference output may be generated based on the labels.

The output of the AI/ML model 206 may be a semantic segmentation model that identifies whether portions of the image are drivable or non-drivable. The AI/ML model 206 may perform iterative operations until the output of the AI/ML model 206 substantially matches the reference output based on the labels. The AI/ML model 206 may adjust its biases and coefficients in its layers to generate an output for each segment substantially matching its respective reference output.

The training images may include different objects to train the AI/ML model 206 to detect different type of objects with different characteristics and intensities. After the AI/ML model 206 completes the training process, it can be used in normal operation mode to detect drivable and non-drivable objects in images for controlling navigation of a vehicle, as described above. Navigation control 208 may autonomously operate the vehicle based, at least in part, on the results of the detection system operations, as described in further detail below.

In some examples, the drivable area AI model 206 image may be projected into three dimensions using the 3D sensor data, such as into the stereo disparity plane. In some examples, the AI/ML model 206 may be stored in memory 204 in the vehicle or may be provided at a remote location (e.g., cloud platform).

Figure 3:
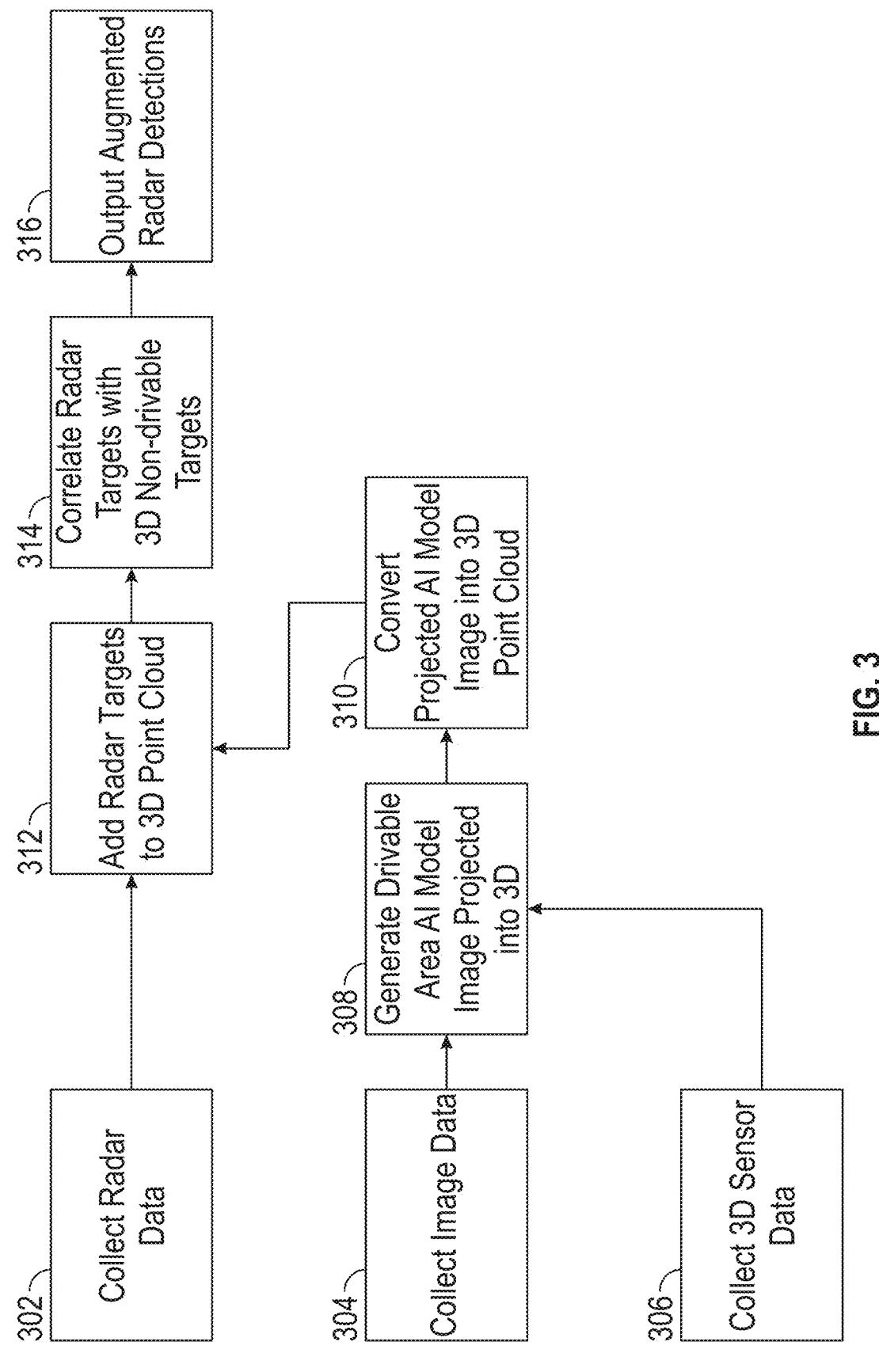
FIG. 3 is a flow diagram of a method 300 for detecting objects using enhanced radar data with contextual information.

FIG. 3 is a flow diagram of a method 300 for detecting objects using enhanced radar data with contextual information. In some examples, the method is executed by the detection system 200 (e.g., controller 202) described above with reference to FIG. 2. When discussing method 300 below, an example of a simulated object detection scenario using FIGS. 4-11 will be used to illustrate aspects of certain operations; this scenario is a non-limiting example for illustration purposes only.

At operation 302, radar data is collected. The radar data may include angular orientation, distance, and velocity of detected objects relative to a center of a field of view from reflected signals. The radar data my include a radar plot.

Figure 4:
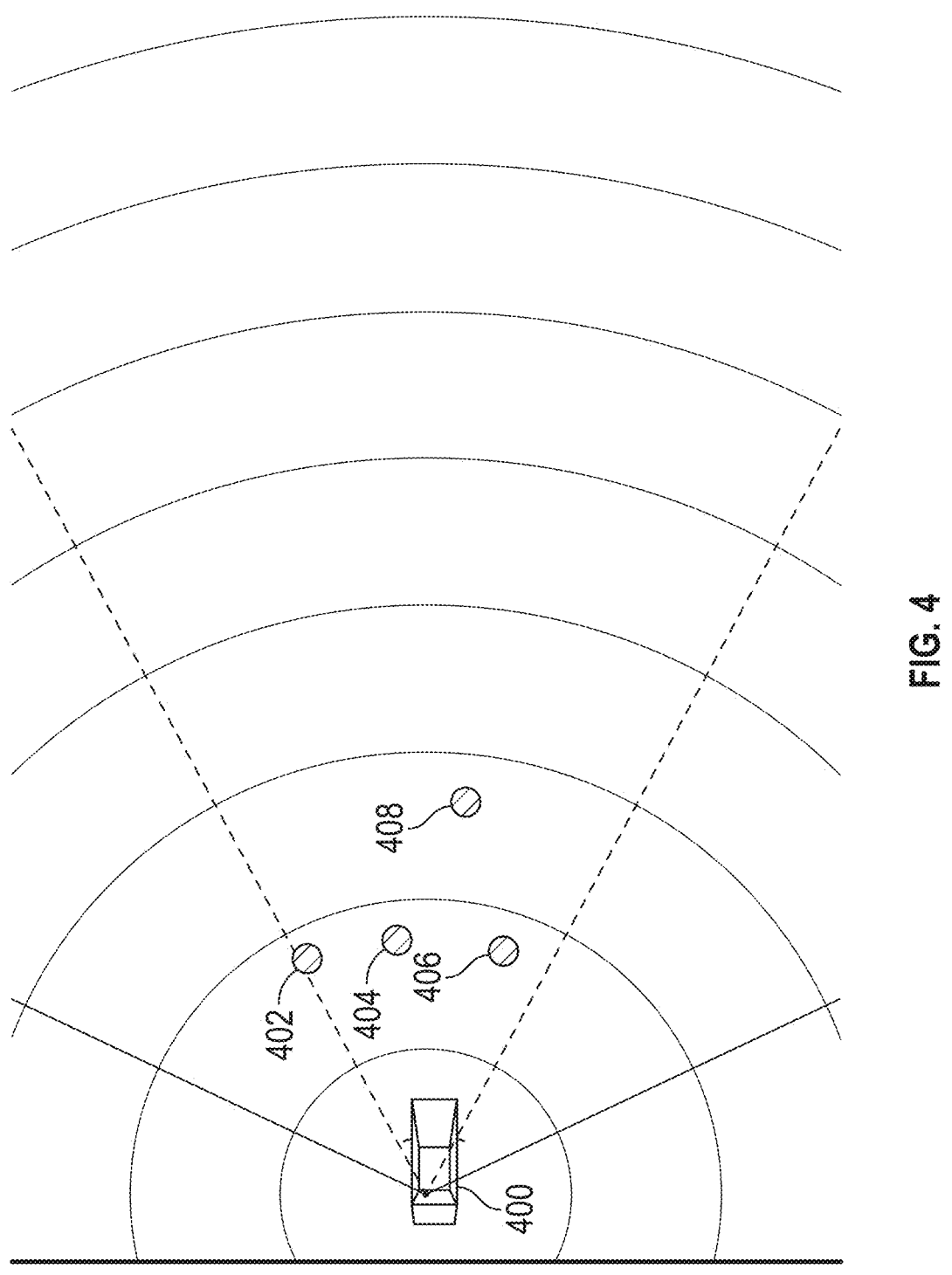
FIG. 4 is an example of a radar data plot showing four objects detected at different locations.

FIG. 4 is an example of a radar data plot showing four objects detected at different locations (e.g., different angular locations and depths). FIG. 4 shows a vehicle 400 with four detected objects 402-408 in the field of view. The radar targets 402-408 at this phase are in an unconfirmed state indicating that the system cannot determine yet if the radar targets should be retained (i.e., are non-drivable objects) or removed (i.e., are non-drivable objects).

At operation 304, image data is collected. For example, a RGB image of the field of view may be captured. In some examples, the image capture may be triggered by the collection of the radar data.

Figure 5:
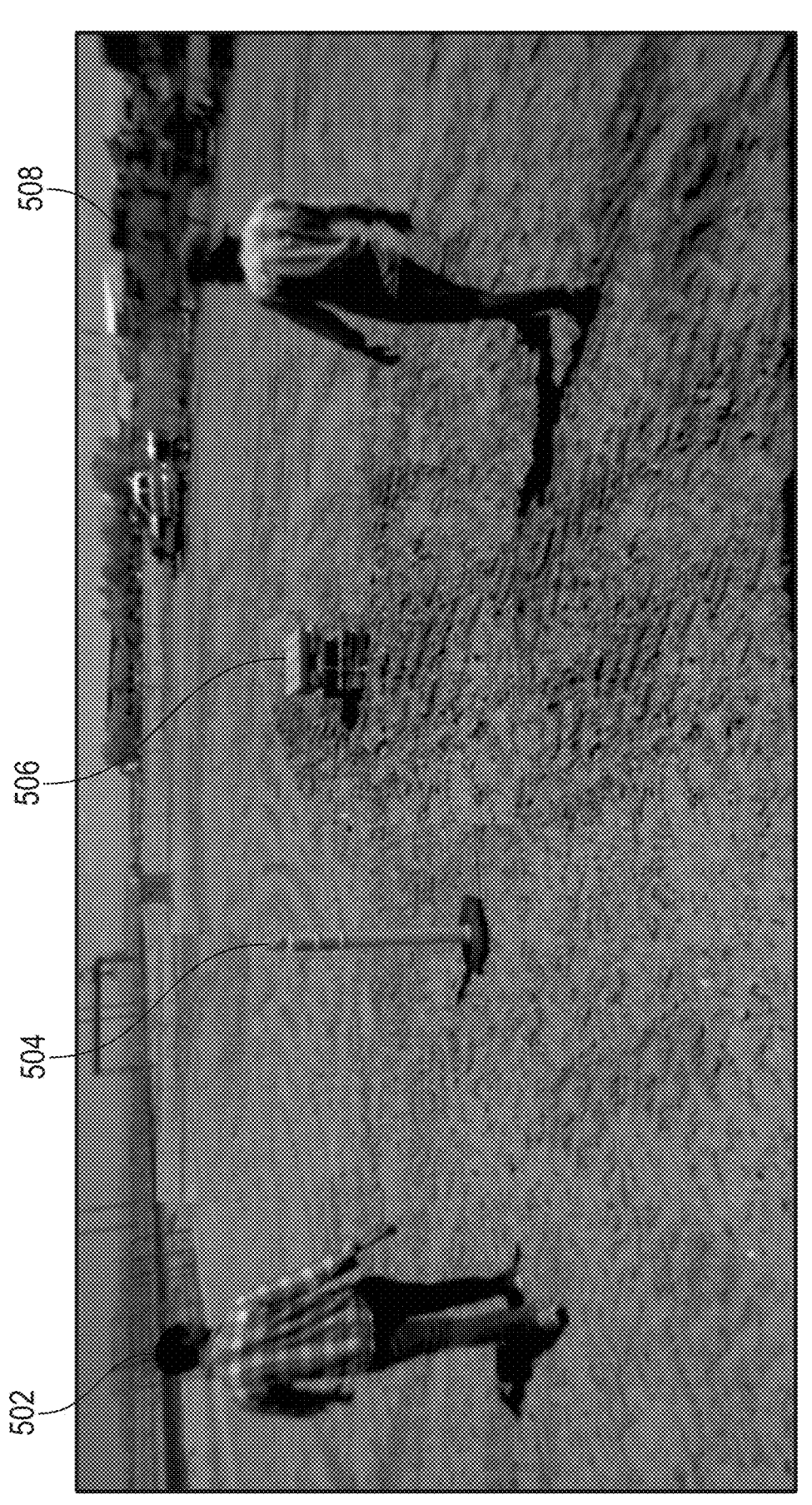
FIG. 5 is an example of an image in greyscale.

FIG. 5 is an example of an image in greyscale. The image shows four objects 502-508 in the field of view of the vehicle. Object 502 is a first human. Object 504 is a cone representing a single corn stalk in the field in this example. Object 506 is a set of wooden blocks. Object 508 is a second human. As discussed below, the vehicle should avoid objects 502 (first human), 506 (set of wooden blocks), and 508 (second human) for safety reasons and/or to prevent damage to the vehicle. In contrast, object 504 represents a single corn stalk that if detected by a radar-only system can cause a false-positive stop in the field. The vehicle can drive over object 504 in this example.

At operation 306, 3D sensor data is collected. The 3D sensor data may include high spatial resolution depth measurement data. In some examples, the 3D sensor data collection may be triggered by the collection of the radar data.

Figure 6:
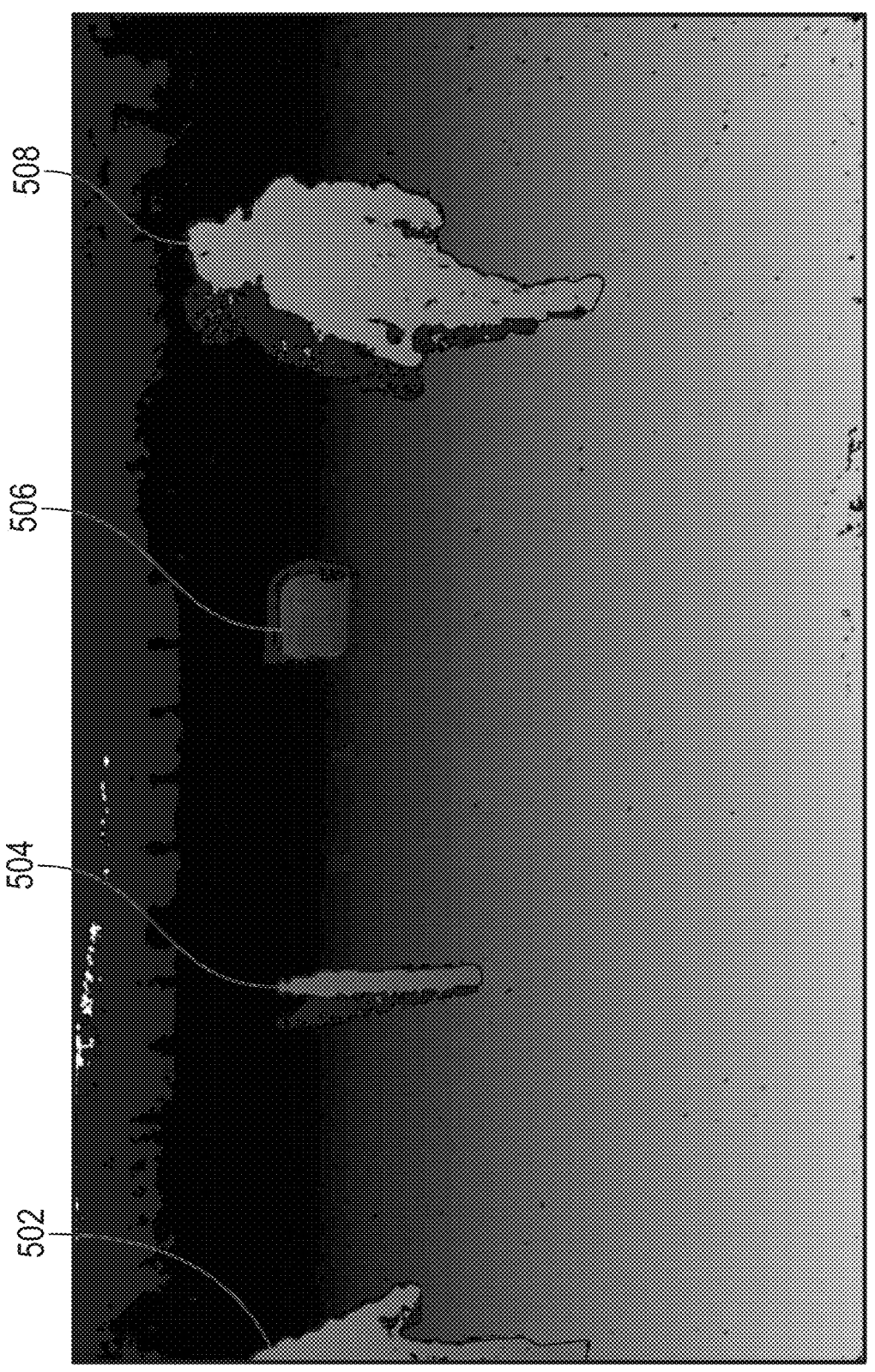
FIG. 6 is an example an example of a disparity image captured by a stereo camera system.

FIG. 6 is an example an example of a disparity image captured by a stereo camera system, which is a type of 3D sensor data. FIG. 6 shows objects 502, 504, 506, 508 with depth measurements.

At operation 308, the image data (e.g., RGB image) is inputted into a drivable area AI/ML model. The AI/ML model may include a deep learning model to identify drivable and non-drivable objects in the image data, as described above. The output of inputting the image data into the AI/ML model may be a semantic segmentation model that identifies whether portions of the image are drivable or non-drivable. The drivable area AI model image may be projected into three dimensions using the 3D sensor data, such as into a stereo disparity plane.

Figure 7:
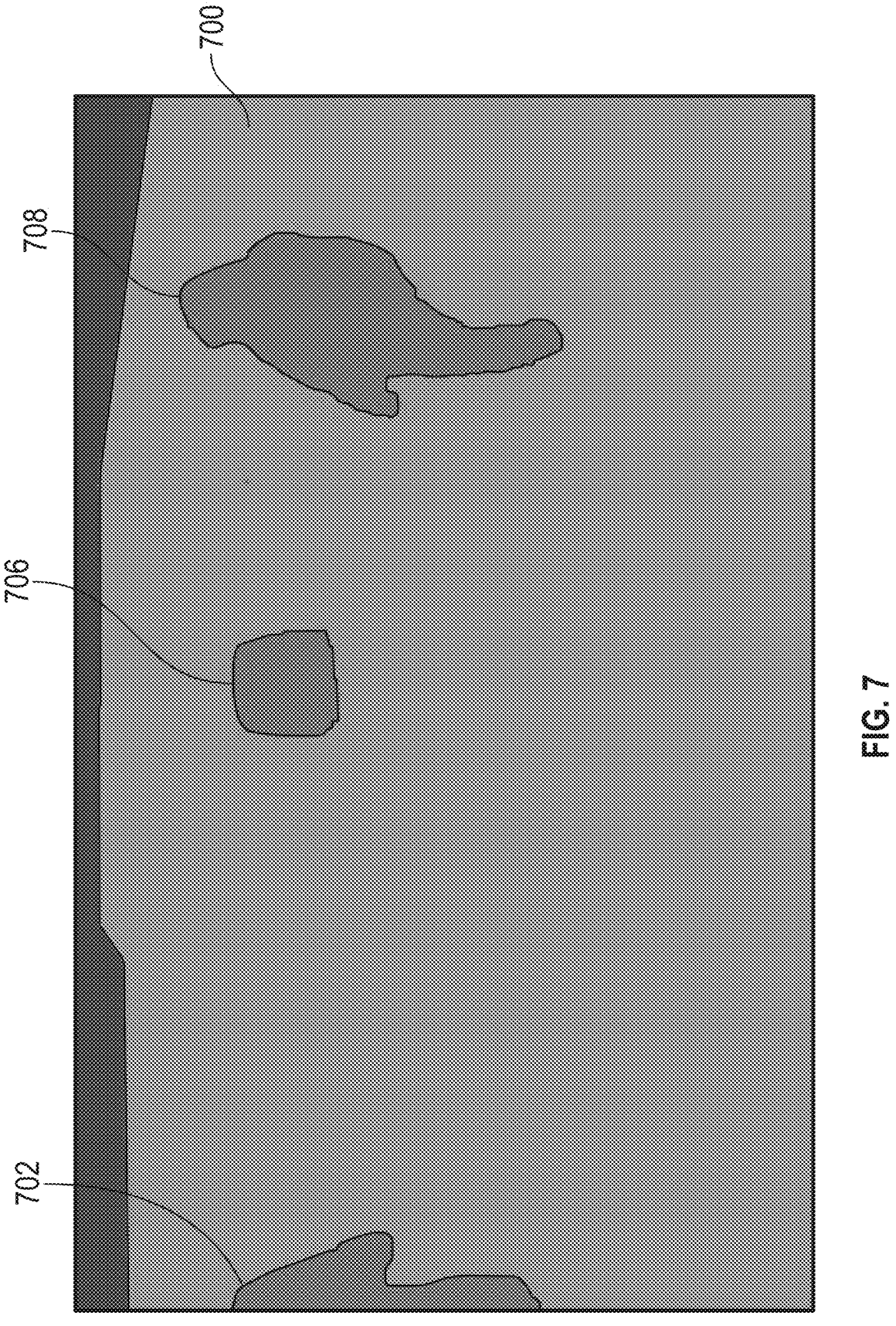
FIG. 7 is an example of drivable/non-drivable area AI model projected into the stereo plane.

FIG. 7 is an example of drivable/non-drivable area AI model projected into the stereo plane. Area 700 represents drivable area while the objects 702, 706, 708 represent non-drivable areas identified by the AI model. As shown, the single corn stalk (represented by the object 504 of FIG. 5) was classified as being part of the drivable area as opposed to the other three objects 502, 506, 508, which were classified as non-drivable areas 702, 706, 708 respectively.

At operation 310, the 3D projected AI model image of drivable areas and non-drivable areas is converted into a 3D space, such as a 3D stereo point cloud. A 3D stereo point cloud is a discrete set of data points in 3D space where each position has a set of unique coordinates (e.g., x, y, z).

Figure 8:
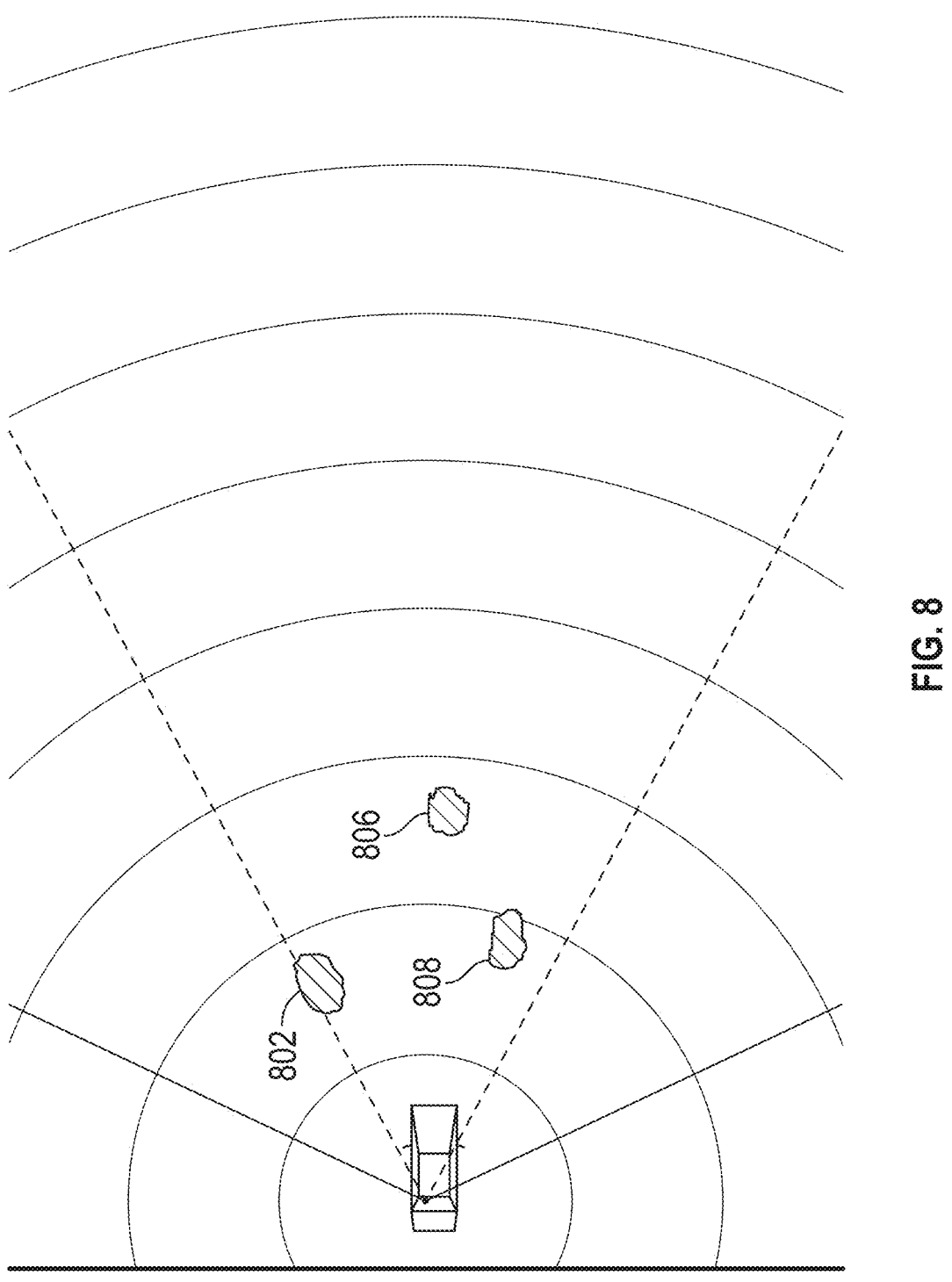
FIG. 8 is a top-down view of an example of non-drivable objects from the projected AI model image projected into 3D space.

FIG. 8 is a top-down view of an example of non-drivable objects from the projected AI model image projected into 3D space. Object 702 (first human) is represented by non-drivable object 802. Object 706 (set of wooden blocks) is represented by non-drivable object 806. Object 708 (second human) is represented by non-drivable object 808.

At operation 312, the detected radar targets are combined with the 3D point cloud. In some examples, the system may remove the third dimension of height for the 3D stereo point cloud which results in having a 2D top-down view of the targets. The choice of 2D or 3D can be based on a design tradeoff of computational complexity versus having additional state data to represent a potential target.

Figure 9:
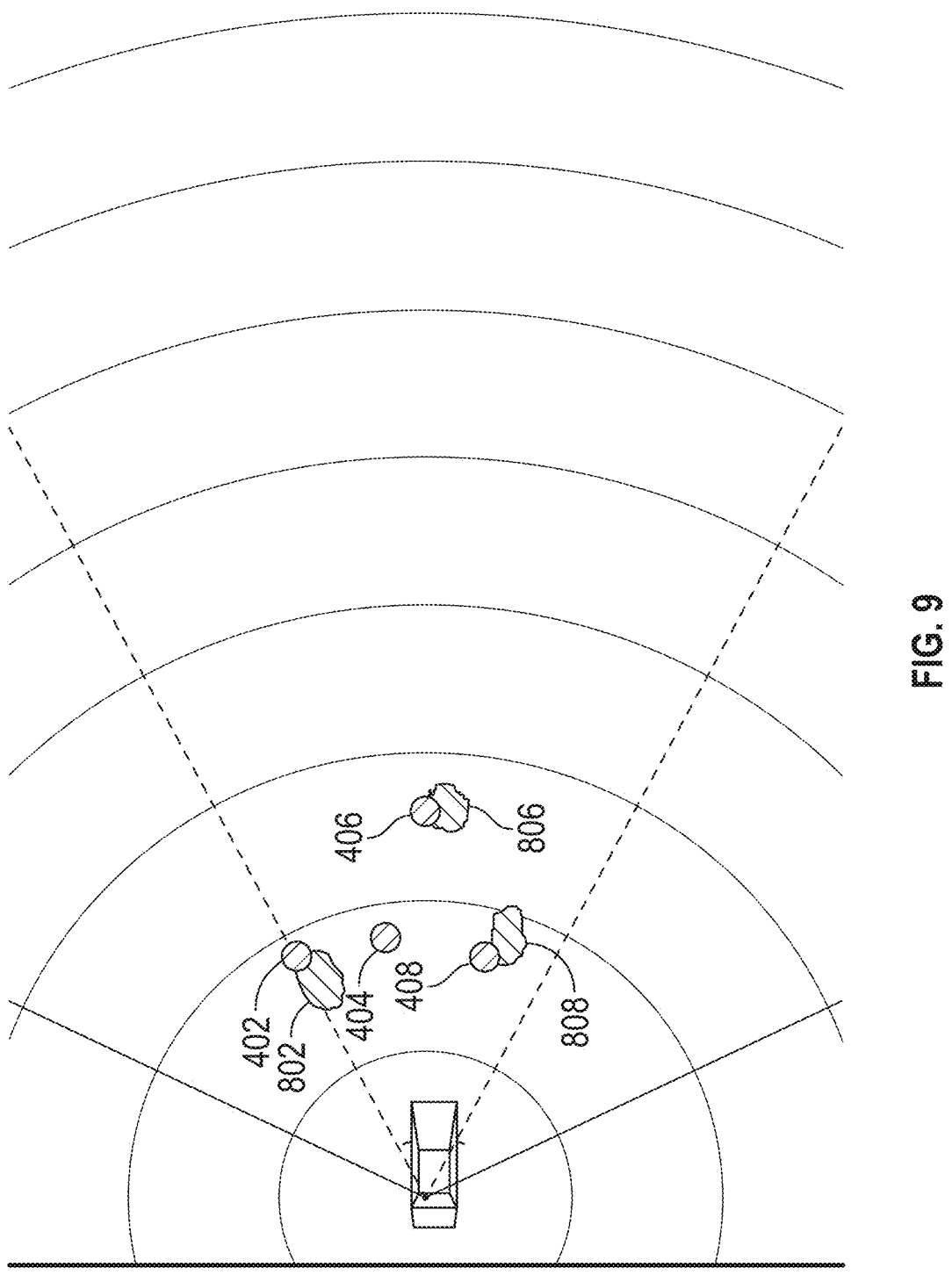
FIG. 9 is an example of the combination of radar and 3D non-drivable targets (top-down view).

FIG. 9 is an example of the combination of radar and 3D non-drivable targets (top-down view). FIG. 9 shows the four radar targets 402, 404, 406, and 408 from FIG. 4. FIG. 9 also shows the three non-drivable object 802, 806, and 808 from FIG. 8.

At operation 314, the radar targets are correlated with corresponding 3D non-drivable targets if present. The radar detections are augmented with 3D drivable space data to determine drivable and non-drivable radar targets. For example, the system may correlate radar objects with corresponding non-drivable objects based on proximity to each other. The system may cautiously remove radar targets when the radar targets correspond to drivable area based on the 3D point cloud (i.e., do not have a corresponding non-drivable object within a set proximity).

In some examples, radar targets and corresponding 3D non-drivable targets may be correlated based on distance. For example, for each radar target, a circle (also referred to as circle of association) or another shape may be generated around the respective radar target in the 2D plane. The size of the circle of association (e.g., length of radius) can be based on accuracy specifications of the two different depth sensor technologies (radar and 3D sensor in this case).

Figure 10:
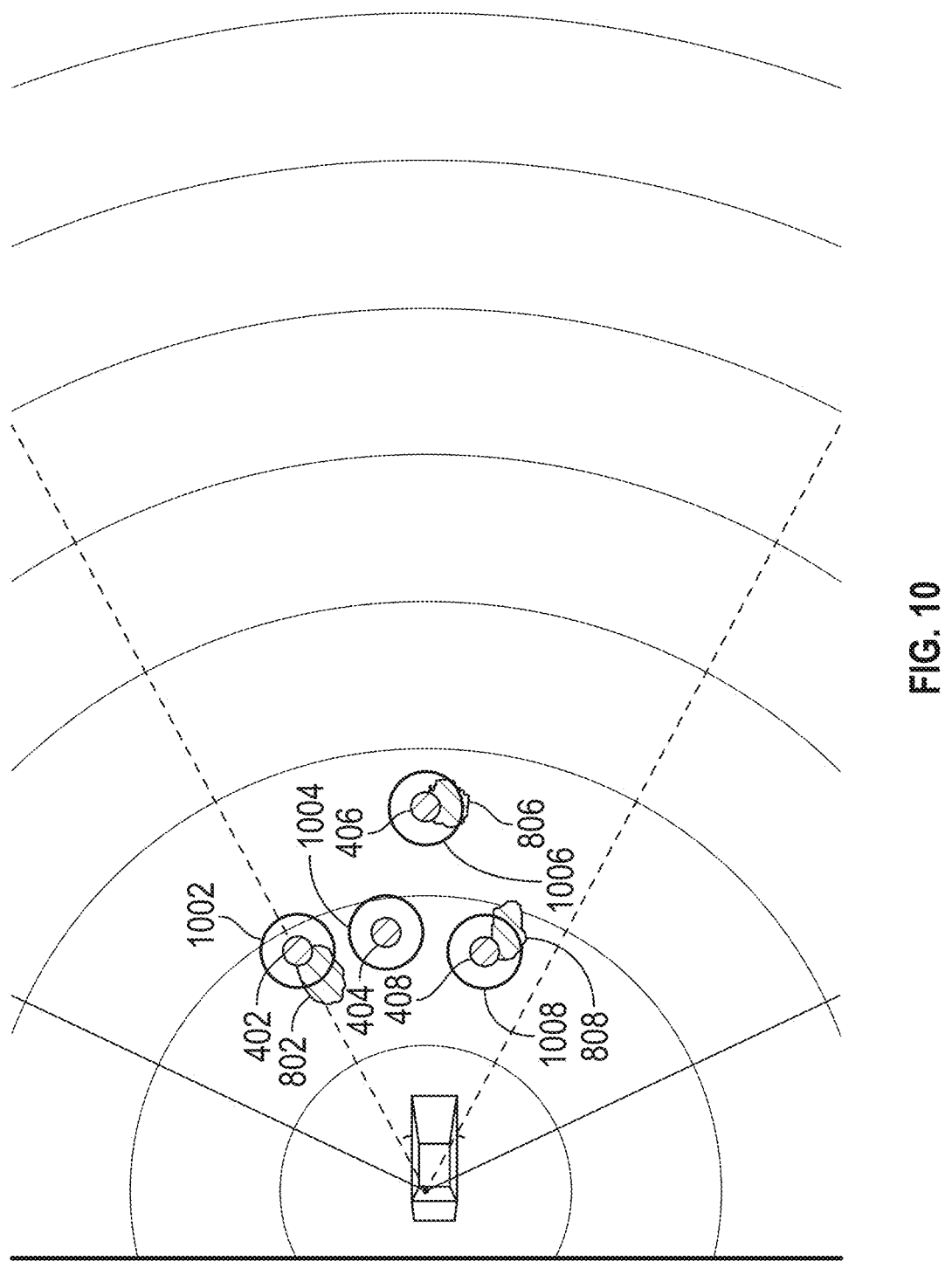
FIG. 10 is an example of radar and 3D non-drivable targets with circles of association around the radar targets (top-down view).

FIG. 10 is an example of radar and 3D non-drivable targets with circles of association around the radar targets (top-down view). Circle 1002 may be generated around radar target 402. Circle 1004 may be generated around radar target 404. Circle 1006 may be generated around radar target 406. Circle 1008 may be generated around radar target 408.

Within each of the circle of associations, a correlation operation can be performed to determine a likelihood of validity for the radar target. A comparison can be performed of radar targets with 3D non-drivable targets for partial or full overlap. For example, some level of thresholding on different parameters can be performed. The different parameters that can be used for this operation include, but are not limited to: min-max-average-st dev values of the drivable/non-drivable area projection in the circle of association; quantity of non-drivable area points in the circle of association; proximity of the radar target to the non-drivable area target; the radar target return signal power, probability of target existence, standard deviation of measured angle, speed and distance, history of target, and target ID; and tracking accuracy of targets through linear projections.

In FIG. 10, the radar target 402 may be correlated with non-drivable object 802 because the non-drivable object 802 is at least partially within circle 1002. Likewise, radar target 406 and radar target 408 may be correlated with non-drivable objects 806 and 808, respectively, because the non-drivable objects 806 and 808 are at least partially within circles 1006 and 1008, respectively. However, no non-drivable object is within circle 1004 for radar target 404. In this example, the radar target 404 represents the single corn stalk and does not have a corresponding 3D non-drivable target.

After this correlation (or association) step, the overall dataset of valid radar targets can be either be equal to what was received from the radar sensor or reduced. The new dataset can be more representative of the real-world conditions of risk. The benefits include reducing the likelihood of false positive stopping events while maintaining a high resistance to false negative events.

Figure 11:
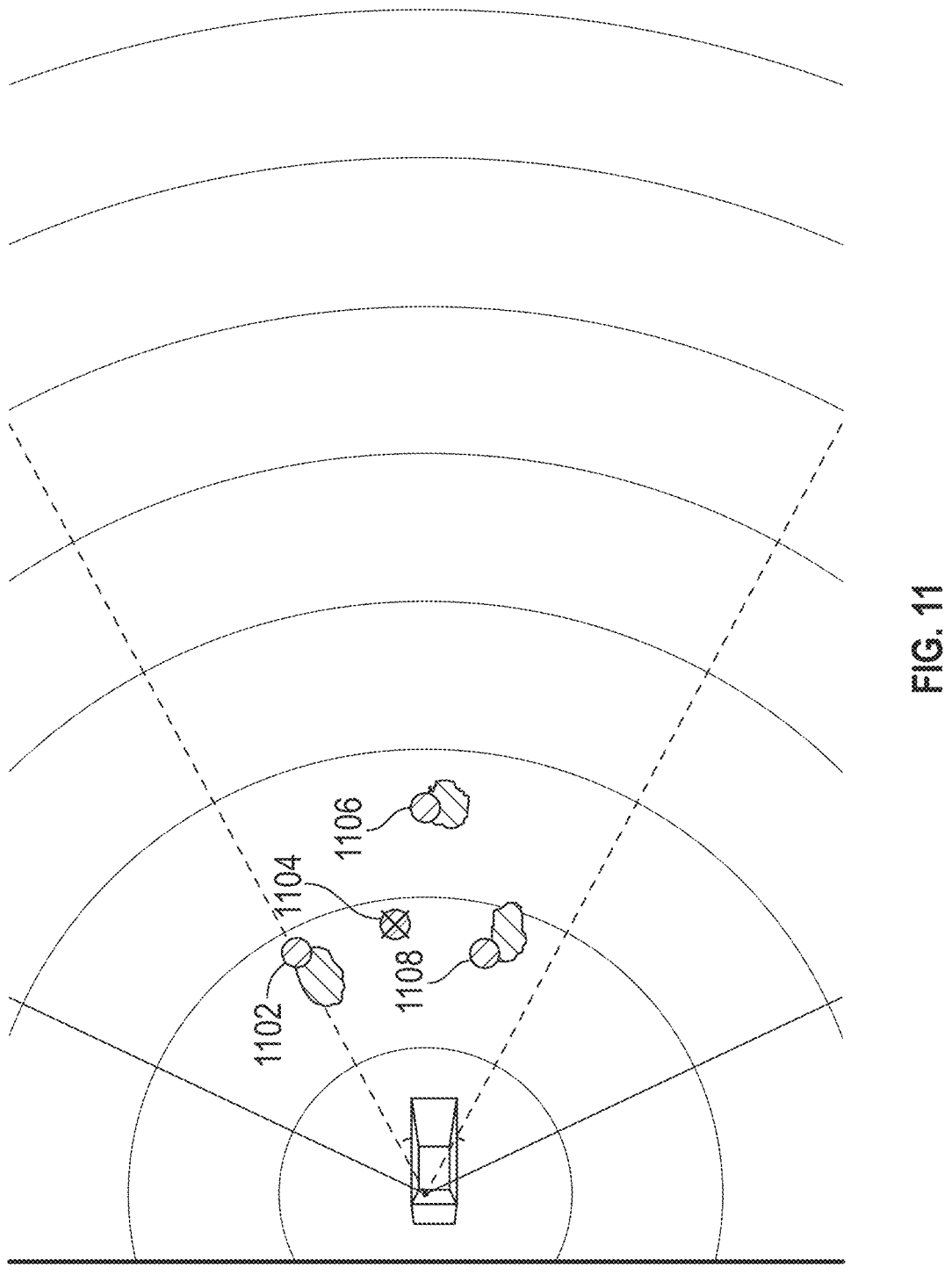
FIG. 11 is an example of radar and 3D non-drivable targets after radar exclusion (top-down view).

FIG. 11 is an example of radar and 3D non-drivable targets after radar exclusion (top-down view). Target 1104 represents the single corn stalk, which can be removed from the dataset, and the other targets 1102, 1106, 1108 remain the dataset because they remain risk targets (i.e., non-drivable).

At operation 316, the augmented radar detections is outputted. For example, the augmented radar detections may be transmitted to a collision detection system to control driving operations of the vehicle, such as navigation control. For example, the navigation control may adjust the path of the vehicle based on confirmed non-drivable objects 1102, 1006, and 1108, while the navigation control may not adjust the path of the vehicle based on confirmed drivable object 1104.

In some examples, time synchronization may be applied to the different sensor data. For example, the collection of the radar data may trigger the capture of image and 3D sensor data. To account for possible time delay, the radar data may be adjusted to match the captured image and 3D sensor data. For example, the radar data map may be contracted (or shrunk) based on the velocity and yaw rate of the vehicle.

Figure 12:
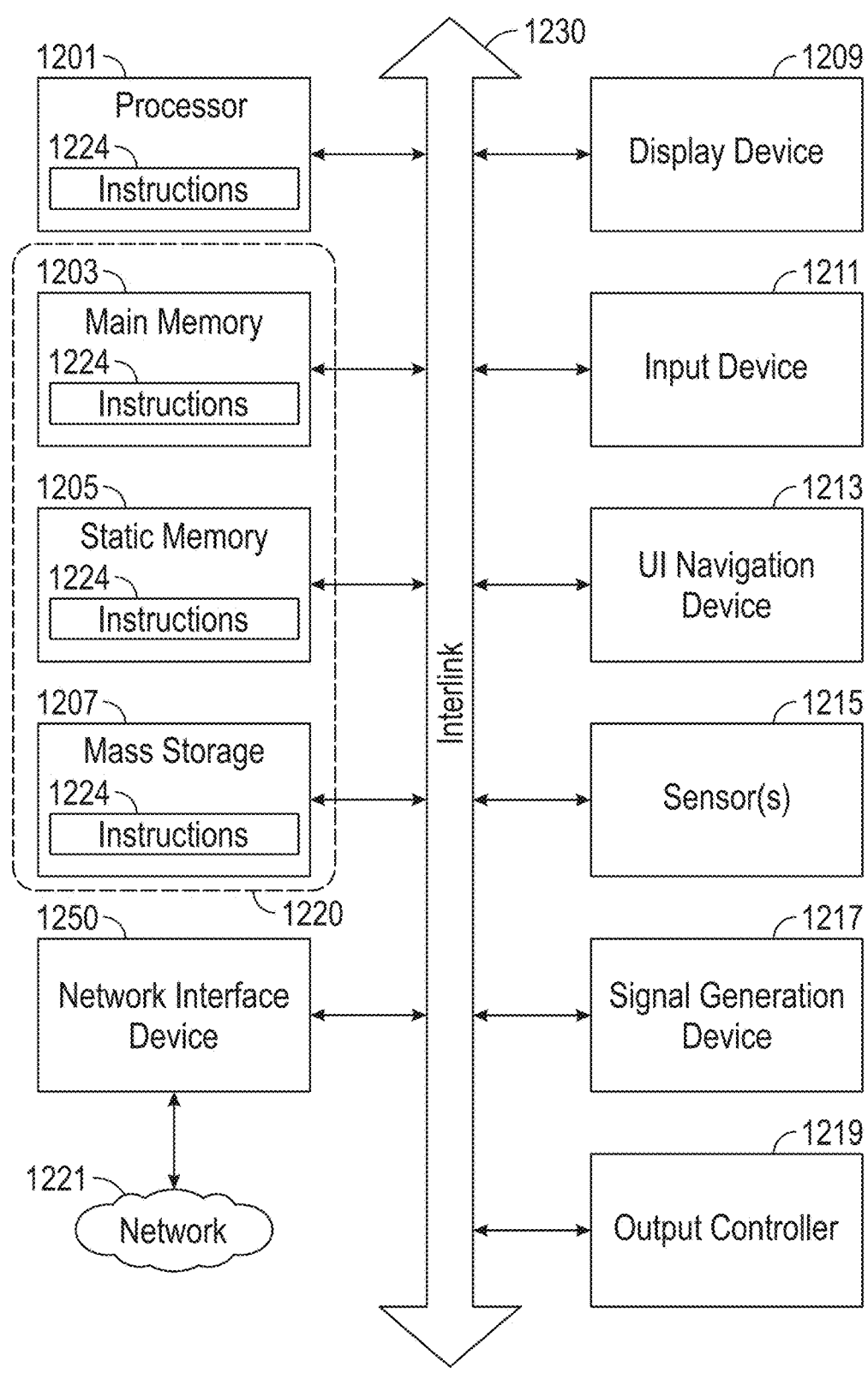
FIG. 12 illustrates a block diagram of an example comprising a machine upon which any one or more of the techniques (e.g., methodologies) discussed herein may be performed.

The techniques shown and described in this document can be performed using a portion or an entirety of object detection system as described above or otherwise using a machine 1200 as discussed below in relation to FIG. 12. FIG. 12 illustrates a block diagram of an example comprising a machine 1200 upon which any one or more of the techniques (e.g., methodologies) discussed herein may be performed. In various examples, the machine 1200 may operate as a standalone device or may be connected (e.g., networked) to other machines.

In a networked deployment, the machine 1200 may operate in the capacity of a server machine, a client machine, or both in server-client network environments. In an example, the machine 1200 may act as a peer machine in peer-to-peer (P2P) (or other distributed) network environment. The machine 1200 may be a personal computer (PC), a tablet device, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware comprising the circuitry may include variably connected physical components (e.g., execution units, transistors, simple circuits, etc.) including a computer-readable medium physically modified (e.g., magnetically, electrically, such as via a change in physical state or transformation of another physical characteristic, etc.) to encode instructions of the specific operation. In connecting the physical components, the underlying electrical properties of a hardware constituent may be changed, for example, from an insulating characteristic to a conductive characteristic or vice versa. The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine 1200 (e.g., computer system) may include a hardware-based processor 1201 (e.g., a central processing unit (CPU), a graphics processing unit (GPU), a hardware processor core, or any combination thereof), a main memory 1203 and a static memory 1205, some or all of which may communicate with each other via an interlink 1230 (e.g., a bus). The machine 1200 may further include a display device 1209, an input device 1211 (e.g., an alphanumeric keyboard), and a user interface (UI) navigation device 1213 (e.g., a mouse). In an example, the display device 1209, the input device 1211, and the UI navigation device 1213 may comprise at least portions of a touch screen display. The machine 1200 may additionally include a storage device 1220 (e.g., a drive unit), a signal generation device 1217 (e.g., a speaker), a network interface device 1250, and one or more sensors 1215, such as a global positioning system (GPS) sensor, compass, accelerometer, or other sensor. The machine 1200 may include an output controller 1219, such as a serial controller or interface (e.g., a universal serial bus (USB)), a parallel controller or interface, or other wired or wireless (e.g., infrared (IR) controllers or interfaces, near field communication (NFC), etc., coupled to communicate or control one or more peripheral devices (e.g., a printer, a card reader, etc.).

The storage device 1220 may include a machine readable medium on which is stored one or more sets of data structures or instructions 1224 (e.g., software or firmware) embodying or utilized by any one or more of the techniques or functions described herein. The instructions 1224 may also reside, completely or at least partially, within a main memory 1203, within a static memory 1205, within a mass storage device 1207, or within the hardware-based processor 1201 during execution thereof by the machine 1200. In an example, one or any combination of the hardware-based processor 1201, the main memory 1203, the static memory 1205, or the storage device 1220 may constitute machine readable media.

While the machine readable medium is considered as a single medium, the term "machine readable medium" may include a single medium or multiple media (e.g., a centralized or distributed database, and/or associated caches and servers) configured to store the one or more instructions 1224.

The term "machine readable medium" may include any medium that is capable of storing, encoding, or carrying instructions for execution by the machine 1200 and that cause the machine 1200 to perform any one or more of the techniques of the present disclosure, or that is capable of storing, encoding or carrying data structures used by or associated with such instructions. Non-limiting machine-readable medium examples may include solid-state memories, and optical and magnetic media. Accordingly, machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic or other phase-change or state-change memory circuits; magnetic disks, such as internal hard disks and removable disks; magneto-optical disks; and CD-ROM and DVD-ROM disks.

The instructions 1224 may further be transmitted or received over a communications network 1221 using a transmission medium via the network interface device 1250 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., the Institute of Electrical and Electronics Engineers (IEEE) 802.22 family of standards known as Wi-Fi®, the IEEE 802.26 family of standards known as WiMax®), the IEEE 802.27.4 family of standards, peer-to-peer (P2P) networks, among others. In an example, the network interface device 1250 may include one or more physical jacks (e.g., Ethernet, coaxial, or phone jacks) or one or more antennas to connect to the communications network 1221. In an example, the network interface device 1250 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1200, and includes digital or analog communications signals or other intangible medium to facilitate communication of such software.

Various Notes

Each of the non-limiting aspects above can stand on its own or can be combined in various permutations or combinations with one or more of the other aspects or other subject matter described in this document.

The above detailed description includes references to the accompanying drawings, which form a part of the detailed description. The drawings show, by way of illustration, specific implementations in which the invention can be practiced. These implementations are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following aspects, the terms "including" and "comprising" are open-ended, that is, a system, device, article, composition, formulation, or process that includes elements in addition to those listed after such a term in an aspect are still deemed to fall within the scope of that aspect. Moreover, in the following aspects, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

It is to be understood that the steps of the methods described herein are performed by the controller upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller described herein, such as the methods described herein, is implemented in software code or instructions which are tangibly stored on a tangible computer readable medium. The controller loads the software code or instructions via a direct interface with the computer readable medium or via a wired and/or wireless network. Upon loading and executing such software code or instructions by the controller, the controller may perform any of the functionality of the controller described herein, including any steps of the methods described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

The above description is intended to be illustrative, and not restrictive. For example, the above-described examples (or one or more aspects thereof) may be used in combination with each other. Other implementations can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the aspects. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed implementation. Thus, the following aspects are hereby incorporated into the Detailed Description as examples or implementations, with each aspect standing on its own as a separate implementation, and it is contemplated that such implementations can be combined with each other in various combinations or permutations.

The invention claimed is:

1. A system for autonomously-operating an agricultural vehicle, the system comprising:

one or more a radar detectors coupled to the agricultural vehicle to generate radar data including a first set of one or more objects in a navigation path of the agricultural vehicle;

a camera coupled to the agricultural vehicle to generate image data;

a 3D sensor coupled to the agricultural vehicle to generate 3D sensor data; and a processor communicatively coupled to the radar detector, camera, and 3D sensor, the processor configured to:

generating a view including a second set of one or more objects in the navigation path of the autonomously-operated vehicle based on the image data, 3D sensor data, and a model, comprising:

inputting the image data into a machine learning (ML) model trained to identify drivable and non-drivable objects in the image data to generate a drivable area model image including the second set of one or more objects; and projecting the drivable area model image into three dimensions based on the 3D sensor data to generate a 3D projected drivable area model image;

converting the 3D projected drivable area model image into a 3D point cloud including the second set of one or more objects;

comparing the first set of one or more objects and the second set of one or more objects based on the radar data and the 3D point cloud to generated augmented radar detection data;

determining whether a corresponding non-drivable target is present in the 3D point cloud;

in an event there is a corresponding non-drivable target present in the 3D point cloud, identifying the respective object in the first set as a confirmed non-drivable object in the augmented radar detection data; and in an event there is not a corresponding non-drivable target present in the 3D point cloud, identifying the respective object in the first set as a confirmed drivable object in the augmented radar detection data; and outputting the augmented radar detection data to control navigation of the agricultural vehicle.

2. The system of claim 1, wherein determining whether a corresponding non-drivable target is present in the 3D point cloud is based on presence of the non-drivable target within a circle with a radius of a predetermined length.

3. The system of claim 1, wherein determining whether a corresponding non-drivable target is present in the 3D point cloud is based on at least one of min-max-average-st dev values of drivable/non-drivable area projection in a circle of association, quantity of non-drivable area points in the circle of association; proximity of the respective object in the first set to the non-drivable area target; the respective object in a first set return signal power, probability of target existence, standard deviation of measured angle, speed and distance, history of target, and target ID; or tracking accuracy of targets through linear projections.

4. The system of claim 1, wherein the 3D sensor includes a stereo camera system and the 3D sensor data includes a disparity image.

5. The system of claim 1, wherein the 3D sensor includes a lidar sensor.

6. The system of claim 1, wherein the model includes a deep learning model trained to detect drivable and non-drivable areas in images.

7. A method for operating an agricultural vehicle, the method comprising:

receiving radar data including a first set of one or more objects in a navigation path of the agricultural vehicle;

receiving image data;

receiving 3D sensor data;

generating a view including a second set of one or more objects in the navigation path of the agricultural vehicle based on the image data, 3D sensor data, and a model, comprising:

inputting the image data into a machine learning (ML) model trained to identify drivable and non-drivable objects in the image data to generate a drivable area model image including the second set of one or more objects; and projecting the drivable area model image into three dimensions based on the 3D sensor data to generate a 3D projected drivable area model image;

converting the 3D projected drivable area model image into a 3D point cloud including the second set of one or more objects;

comparing the first set of one or more objects and the second set of one or more objects based on the radar data and the 3D point cloud to generated augmented radar detection data;

determining whether a corresponding non-drivable target is present in the 3D point cloud;

in an event there is a corresponding non-drivable target present in the 3D point cloud, identifying the respective object in the first set as a confirmed non-drivable object in the augmented radar detection data; and in an event there is not a corresponding non-drivable target present in the 3D point cloud, identifying the respective object in the first set as a confirmed drivable object in the augmented radar detection data; and outputting the augmented radar detection data to control navigation of the agricultural vehicle.

8. The method of claim 7, wherein determining whether a corresponding non-drivable target is present in the 3D point cloud is based on presence of the non-drivable target within a circle with a radius of a predetermined length.

9. The method of claim 7, wherein determining whether a corresponding non-drivable target is present in the 3D point cloud is based on at least one of min-max-average-st dev values of drivable/non-drivable area projection in a circle of association, quantity of non-drivable area points in the circle of association; proximity of the respective object in the first set to the non-drivable area target; the respective object in a first set return signal power, probability of target existence, standard deviation of measured angle, speed and distance, history of target, and target ID; or tracking accuracy of targets through linear projections.

10. The method of claim 7, wherein the 3D sensor data includes a disparity image captured by a stereo camera system.

11. The method of claim 7, wherein the 3D sensor data includes lidar data.

12. The method of claim 7, wherein the model includes a deep learning model trained to detect drivable and non-drivable areas in images.

13. A machine-readable medium embodying instructions that, when executed by a machine, cause the machine to perform operations comprising:

receiving radar data including a first set of one or more objects in a navigation path of an agricultural vehicle;

receiving image data;

receiving 3D sensor data;

generating a view including a second set of one or more objects in the navigation path of the agricultural vehicle based on the image data, 3D sensor data, and a model, comprising:

inputting the image data into a machine learning (ML) model trained to identify drivable and non-drivable objects in the image data to generate a drivable area model image including the second set of one or more objects; and projecting the drivable area model image into three dimensions based on the 3D sensor data to generate a 3D projected drivable area model image;

converting the 3D projected drivable area model image into a 3D point cloud including the second set of one or more objects;

comparing the first set of one or more objects and the second set of one or more objects based on the radar data and the 3D point cloud to generated augmented radar detection data;

determining whether a corresponding non-drivable target is present in the 3D point cloud;

in an event there is a corresponding non-drivable target present in the 3D point cloud, identifying the respective object in the first set as a confirmed non-drivable object in the augmented radar detection data; and in an event there is not a corresponding non-drivable target present in the 3D point cloud, identifying the respective object in the first set as a confirmed drivable object in the augmented radar detection data; and outputting the augmented radar detection data to control navigation of the agricultural vehicle.

14. The machine-readable medium of claim 13, wherein determining whether a corresponding non-drivable target is present in the 3D point cloud is based on presence of the non-drivable target within a circle with a radius of a predetermined length.

15. The machine-readable medium of claim 13, wherein determining whether a corresponding non-drivable target is present in the 3D point cloud is based on at least one of min-max-average-st dev values of drivable/non-drivable area projection in a circle of association, quantity of non-drivable area points in the circle of association; proximity of the respective object in the first set to the non-drivable area target; the respective object in a first set return signal power, probability of target existence, standard deviation of measured angle, speed and distance, history of target, and target ID; or tracking accuracy of targets through linear projections.

16. The machine-readable medium of claim 13, wherein the 3D sensor data includes a disparity image captured by a stereo camera system.

17. The machine-readable medium of claim 13, wherein the 3D sensor data includes lidar data.

18. The machine-readable medium of claim 13, wherein the model includes a deep learning model trained to detect drivable and non-drivable areas in images.

* * * * *